(12) United States Patent
Inoue et al.

(10) Patent No.: US 7,824,058 B2
(45) Date of Patent: Nov. 2, 2010

(54) WAKE-UP APPARATUS

(75) Inventors: Manabu Inoue, Katano (JP); Masakazu Yamamoto, Hirakata (JP)

(73) Assignee: Panasonic Electric Works Co., Ltd., Kadoma-Shi (JP)

( * ) Notice: Subject to any disclaimer, the term of this patent is extended or adjusted under 35 U.S.C. 154(b) by 242 days.

(21) Appl. No.: 12/094,853

(22) PCT Filed: Nov. 24, 2006

(86) PCT No.: PCT/JP2006/323395
§ 371 (c)(1),
(2), (4) Date: May 23, 2008

(87) PCT Pub. No.: WO2007/061031
PCT Pub. Date: May 31, 2007

(65) Prior Publication Data
US 2009/0116234 A1    May 7, 2009

(30) Foreign Application Priority Data
Nov. 25, 2005 (JP) ............................. 2005-340106

(51) Int. Cl.
*F21V 33/00* (2006.01)
(52) U.S. Cl. ............................. 362/130; 362/127; 5/905
(58) Field of Classification Search ................ 362/234, 362/231, 130, 127–129, 131–134; 5/616, 5/617–619, 666, 905, 906
See application file for complete search history.

(56) References Cited
U.S. PATENT DOCUMENTS
5,079,682 A * 1/1992 Roberts ....................... 362/276

6,595,654 B2 * 7/2003 Washburn .................... 362/130

FOREIGN PATENT DOCUMENTS

| GB | 2308901 | 7/1997 |
|---|---|---|
| JP | 54-118185 | 8/1979 |
| JP | 2-024396 | 2/1990 |
| JP | 7-318670 | 12/1995 |
| JP | 2002-200171 | 7/2002 |
| JP | 2002-336358 | 11/2002 |
| JP | 2003-215279 | 7/2003 |
| JP | 2004-146227 | 5/2004 |
| JP | 2005-063687 | 3/2005 |

OTHER PUBLICATIONS

English language Abstract of JP 7-318670.

(Continued)

*Primary Examiner*—Gunyoung T Lee
(74) *Attorney, Agent, or Firm*—Greenblum & Bernstein P.L.C.

(57) ABSTRACT

In a wake-up apparatus for waking up a sleeper by light stimulus, it wakes the sleeper comfortably without feeling glare. A lighting device has a first lighting unit at a position that a light emitting face cannot be observed directly by the sleeper, and a second lighting unit at a position that a light emitting face can be observed directly by the sleeper. A control device activates the lighting device a predetermined time before a preset wake-up time so as to vary illuminance of light emitted from the lighting device in an order of low illuminance, middle illuminance and high illuminance, to light only the first lighting unit in a low illuminance condition and a middle illuminance condition, and to light both of the first lighting unit and the second lighting unit in a high illuminance condition, and quickly varies from the middle illuminance condition to the high illuminance condition.

6 Claims, 5 Drawing Sheets

OTHER PUBLICATIONS

English language Abstract of JP 2002-200171.
English language Abstract of JP 2005-063687.
English language Abstract of JP 2004-146227.
English Language Abstract of JP 2003-215279.
English language Abstract of JP 2002-336358.
English language Abstract of JP 54-118185.
English language Abstract of JP 2-024396.

* cited by examiner

WAKE-UP APPARATUS

TECHNICAL FIELD

The present invention relates to a wake-up apparatus for waking up a sleeper from sleeping by light stimulus.

BACKGROUND ART

A wake-up apparatus, which controls illumination light to increase brightness gradually from a time before preset wake-up time for waking up a sleeper from sleeping smoothly by gradually making the sleep of the person light, is proposed conventionally.

A conventional wake-up apparatus, which is disclosed in Japanese Patent Publication Hei 07-318670, for example, increases illuminance on a face of a sleeper from 0 to 200 lx gradually by lighting a low-light intensity lighting unit which is disposed at a position from which the face of the sleeper cannot be lit directly from a time before 30 to 60 minutes of a wake-up time the sleeper desires, and subsequently, increases the illuminance on the face of the sleeper gradually by lighting a high-light intensity lighting unit which is disposed at a position from which the face of the sleeper can be lit directly from a time before 5 to 10 minutes of the wake-up time, and the illuminance of the face of the sleeper is increased over 2000 lx 1 minutes before the wake-up time. By making up a condition from predawn to daylight artificially, comfortable wake-up can be provided in view of the biological rhythm.

Figure 8:
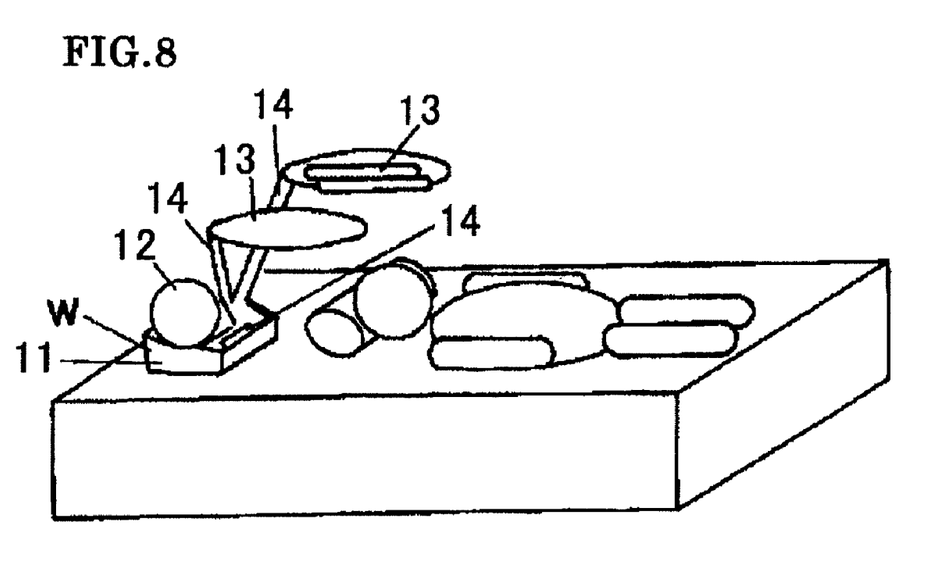
FIG. 8 is a perspective view showing a configuration of a conventional wake-up apparatus.

FIG. 8 shows a configuration of the above mentioned conventional wake-up apparatus. The conventional wake-up apparatus 10 is a stand-type one which is disposed on a bedside of a sleeper, and has a first lighting device 12 which is disposed on an upper face of a main frame 11, and second lighting devices 13 which are provided at front ends of two arms 14 standing up from the main frame 11. The first lighting device 12, which emits low illuminance light, emits lights all around with using an incandescent lamp as a light source, and it is disposed at a position so that the output light does not irradiate a face of the sleeper directly. On the other hand, the second lighting devices 13, which emit middle illuminance light and high illuminance light, have directivity given by fluorescent lamps as light sources and reflection umbrellas. In addition, the face of the sleeper can be irradiated directly by adjusting directions of arms 14 and the reflection umbrellas.

DISCLOSURE OF INVENTION

In order to make the illuminance on the face of the sleeper equal to or more than 2,000 lx within one minute from a preset wake-up time, the brightness of the high illuminance lighting unit, however, becomes much higher. Consequently, the sleeper may feel glare, and he or she cannot wake up pleasantly.

Furthermore, since the second lighting devices which emit high illuminance lights have directivity by the fluorescent lamps as the light sources and the reflection umbrellas, the directivity of the output lights may be lower, and thus, reflected lights by bed sheet may be diffused around the room. Therefore, when a plurality of beds is installed in a bedroom, it is assumed that preset wake-up time of each sleeper may be different, and an adjoining sleeper not on the preset wake-up time may be stimulated and waken up in condition with unpleasantness.

The present invention is conceived to solve the above mentioned problems and an aimed to provide a wake-up apparatus which enables to wake up a sleeper comfortably in consideration with the biological rhythm without feeling glare. In addition, it is objected to provide a wake-up apparatus which enables to wake up only a person on preset wake-up time without stimulating adjoining sleeper not on preset wake-up time, even when a plurality of beds is installed in a bedroom.

A wake-up apparatus in accordance with an aspect of the present invention is characterized by comprising: a setting device for setting a preset wake-up time by a sleeper; a lighting device having a first lighting unit which is disposed at a position so that a light emitting face thereof cannot be observed directly by the sleeper and a second lighting unit disposed at a position so that a light emitting face thereof can be observed directly by the sleeper; and a control device which activates the lighting device a predetermined time before the preset wake-up time so as to vary illuminance of light emitted from the lighting device in an order of low illuminance, middle illuminance and high illuminance, to light only the first lighting unit in a low illuminance condition and a middle illuminance condition, and to light both of the first lighting unit and the second lighting unit in a high illuminance condition, and quickly varies from the middle illuminance condition to the high illuminance condition.

According to the above mentioned configuration, the control device activates the lighting device a predetermined time (30 minutes, for example) before the preset wake-up time set by the sleeper and varies the illuminance of the light emitted from the lighting device in the order of the low-illumination, the middle-illumination and the high-illumination, so that the sleeper can be waked up comfortably, similar to the conventional wake-up apparatus. Furthermore, both of the first lighting unit and the second lighting unit are lit in the high-illumination condition, so that it is possible to decrease the luminance of the second lighting unit which is disposed at a position so that the light emitting face thereof can be observed directly by the sleeper with maintaining the illuminance on a face of the sleeper in a necessary level. Consequently, a possibility that the sleeper feels glare can be decreased.

BEST MODE FOR CARRYING OUT THE INVENTION

A wake-up apparatus 1 in accordance with an embodiment of the present invention is described with reference to figures.

In the following description, when a plurality of sleepers exists, a sleeper who wishes to wake up by using this wake-up apparatus is called as a principal sleeper.

Figure 1:
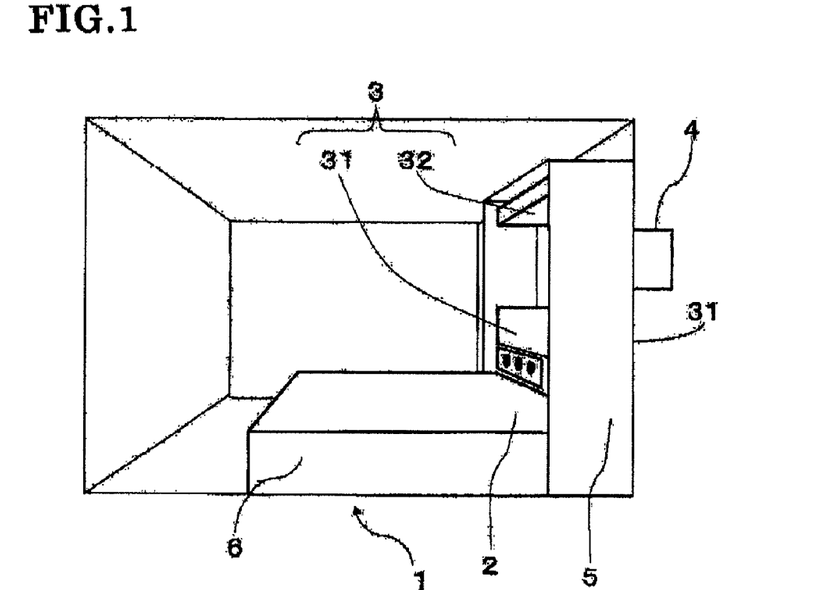
FIG. 1 is a perspective view showing a configuration of a wake-up apparatus in accordance with an embodiment of the present invention.

As shown in FIG. 1, the wake-up apparatus 1 in this embodiment comprises a setting device 2 which is used by a sleeper to set a desired wake-up time and so on, a lighting device 3 which emits light having at least three levels of low illuminance, middle illuminance and high illuminance, and a control device 4 which activates the lighting device 3 corresponding to a preset wake-up time.

The lighting device 3 is configured by a first lighting unit 31 which is disposed at a position so that a light emitting face thereof cannot be observed directly by a sleeper and a second lighting unit 32 which is disposed at a position so that a light emitting face thereof can be observed directly by the sleeper. The first lighting unit 31 is provided inside a headboard 5 which is provided at a pillow side of a bed 6 and disposed at a lower position near to the pillow. The second lighting unit 32 is provided inside the headboard 5 and disposed at a higher position distant from the pillow.

The first lighting unit 31 is a light emitting panel which is configured by a plurality of light emitting diodes arranged inside a thin box-shaped housing and having a width in a longitudinal direction substantially the same as that of the bed 6, and the panel is attached at a position above a bed surface of the bed 6 by a height of 262 to 344 mm. In addition, a light emitting face 31a of the first lighting unit 31 is provided to be substantially perpendicular to the bed surface. Thus, the light emitting face 31a of the first lighting unit 31 cannot be observed directly by the sleeper.

The second lighting unit 32 is a thin light emitting panel which is configured by a plurality of discharge lamps arranged inside a thin box-shaped housing and having a width in a longitudinal direction substantially the same as that of the bed 6, and the panel is attached at a position above the bed surface of the bed 6 by a height of 1145 to 1445 mm. In addition, a light emitting face 32a of the second lighting unit 32 is provided to be substantially parallel to the bed surface and looking downward. Thus, the light emitting face 32a of the second lighting unit 32 can directly radiate a face of the sleeper from a position observable directly by the sleeper.

The setting device 2 is used to set a desired preset wake-up time in digital form, for example, and transmits the preset wake-up time set by the sleeper to the control device 4 through a wired or a wireless data communication which is not illustrated. The control device 4 is configured by a microprocessor, a timer and so on, and controls the light emission of the lighting device 3 corresponding to the current time counted by the timer and the preset wake-up time set by the setting device 2. Specifically, the first lighting unit 31 and the second lighting unit 32 are lit appropriately so as to vary the illuminance of illumination light in an order of low illuminance, middle illuminance and high illuminance, and the variation of illuminance from the low illuminance to middle illuminance is performed slowly and the variation of illuminance from the middle illuminance to the high illuminance is performed quickly. In particular, when shifting from the low illuminance to the middle illuminance, the first lighting unit 31 is lit, and when shifting from the middle illuminance to the high illuminance, both of the first lighting unit 31 and the second lighting unit 32 are lit.

Luminance of the light emitting face of the first lighting unit 31 is set so that the illuminance on the face of the sleeper is in a range from 0 to 150 lx. In addition, luminance of the light emitting face of the second lighting unit 32 is set so that the illuminance on the face of the sleeper is in a range from 0 to 850 lx. Furthermore, when shifting from the middle illumination to the high illumination, the luminance of the light source which is felt by the sleeper is set to be equal to or smaller than 20,000 cd/m$^2$.

Figure 7:
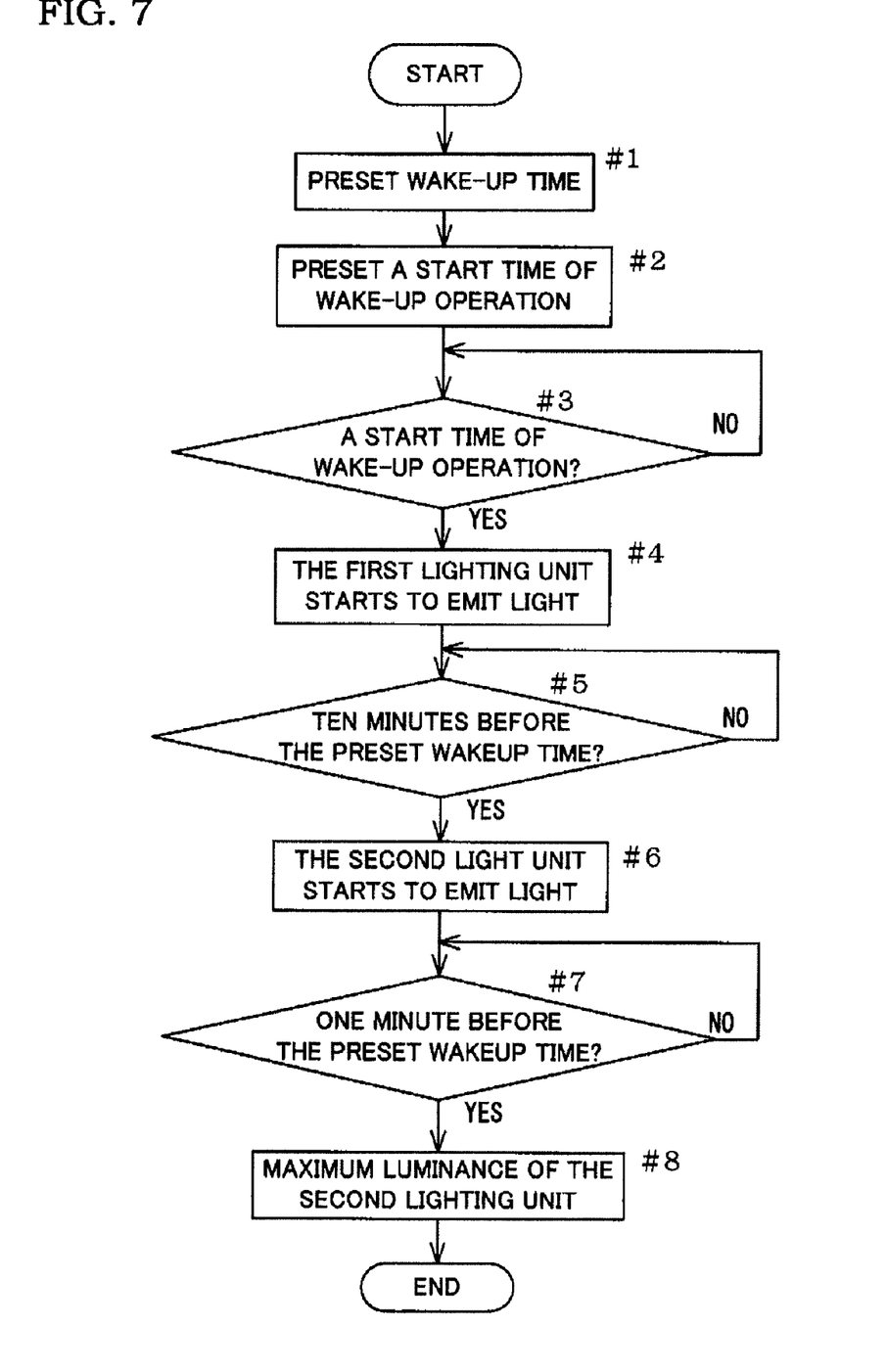
FIG. 7 is a flowchart showing wake-up operation by the above wake-up apparatus.

The lighting device 3 wakes up the sleeper from sleeping, and it is controlled to restage solar isolation before and after dawn so as to keep biological rhythm of the sleeper and to give comfortable wake-up. Lighting controls of the first lighting unit 31 and the second lighting unit 32 of the lighting device 3 are described with reference to FIGS. 2 to 7. FIGS. 2 to 6 visually express output lights from the first lighting unit 31 and the second lighting unit 32 of the lighting device 3, and wherein differences of intensities of the output lights are expressed by lengths and thicknesses of lines. In addition, FIG. 7 is a flowchart showing the wake-up operation by the wake-up apparatus 1.

Figure 2:
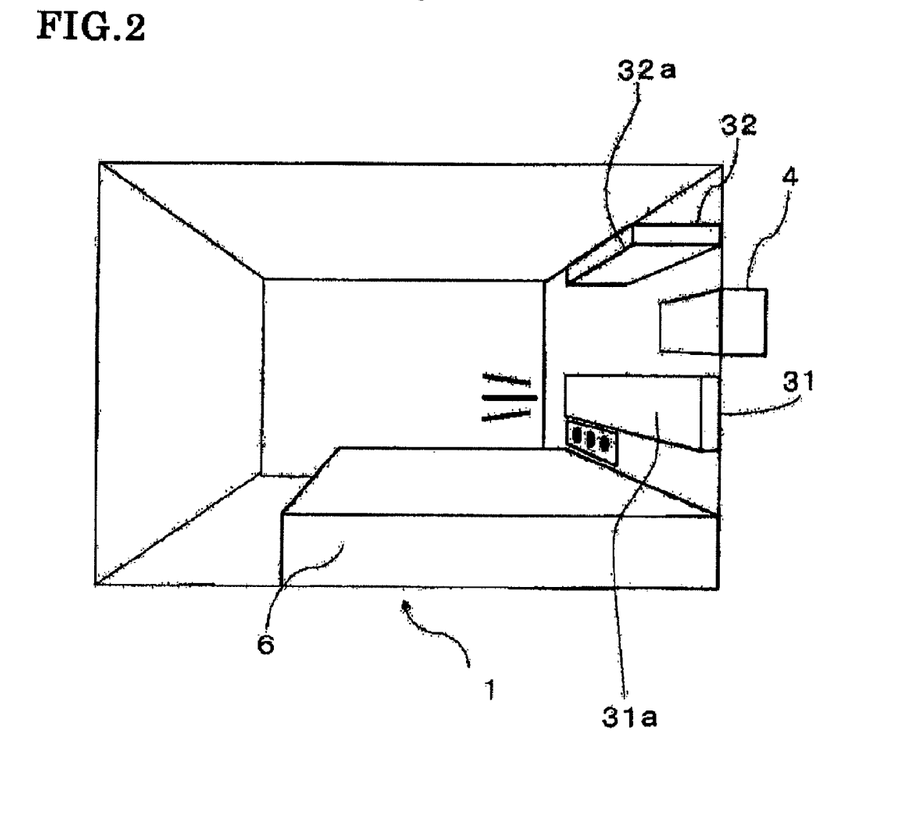
FIG. 2 is a view showing a lighting condition of the above wake-up apparatus 30 minutes before a preset wake-up time.

When the sleeper sets the preset wake-up time by the setting device 2 (#1), the control device 4 sets a time thirty minutes before the preset wake-up time as a start time of wake-up operation (#2). The control device 4 monitors current time counted by the timer, and when it becomes the start time of the wake-up operation (YES in #3), it renders the first lighting unit 31 of the lighting device 3 to emit light so that the illuminance on the face of the sleeper becomes larger than 0 lx but equal to or smaller than 23 lx (#4). FIG. 2 shows a lighting condition of the wake-up apparatus 1 thirty minutes before the preset wake-up time.

Figure 3:
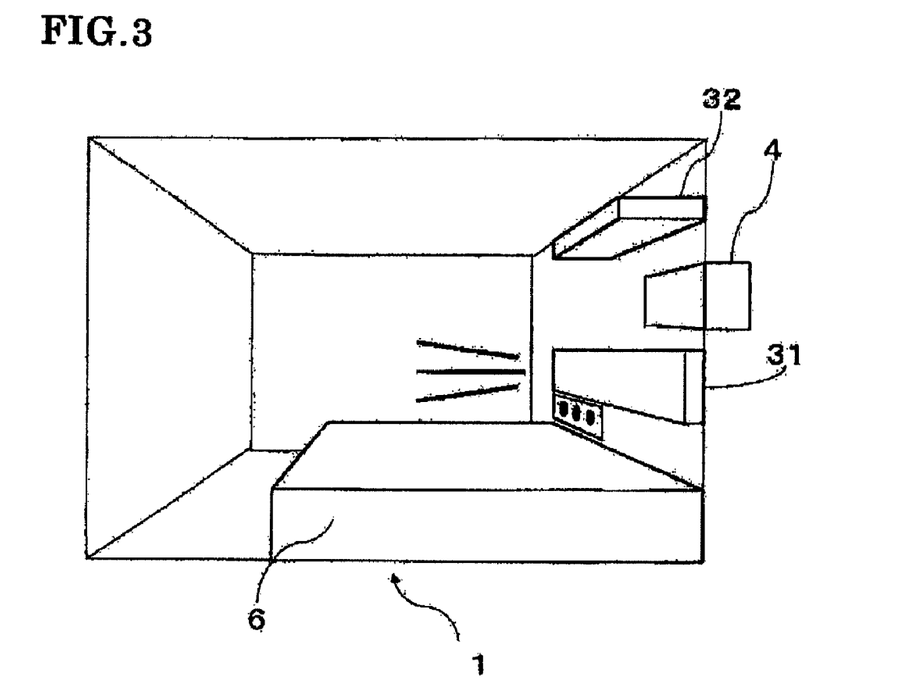
FIG. 3 is a view showing a lighting condition of the above wake-up apparatus 10 minutes before the preset wake-up time, and in a condition that only a first lighting unit is lit.
Figure 4:
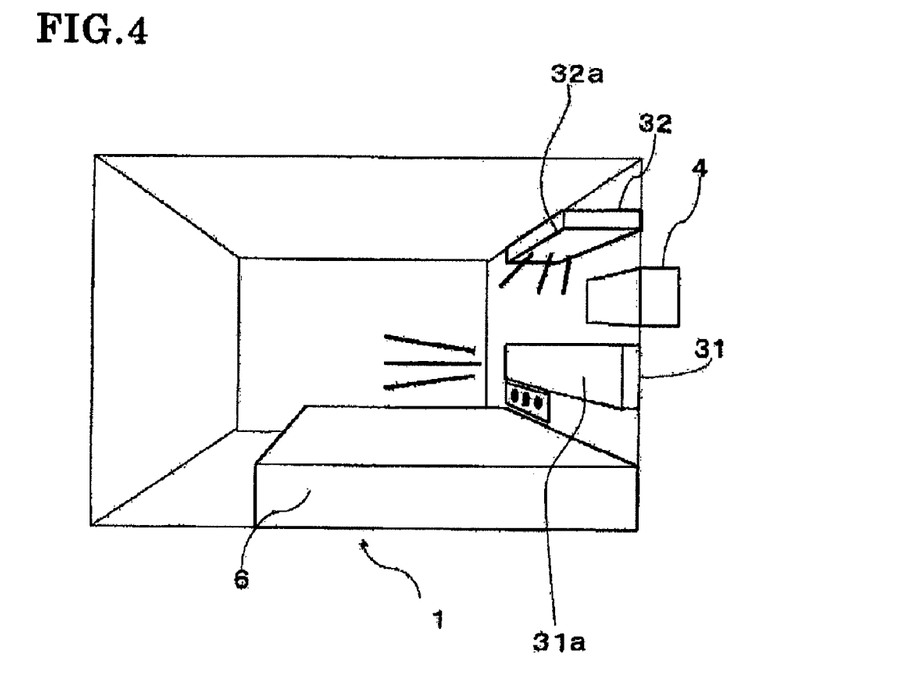
FIG. 4 is a view showing a lighting condition of the above wake-up apparatus 10 minutes before the preset wake-up time, and in a condition that a second lighting unit is started to light.

The control device 4 further monitors current time counted by the timer, and maintains the output level of light emission of the first lighting unit 31 at the start time of the wake-up operation or increases the output level a little until ten minutes before the preset wake-up time. When it becomes ten minutes before the preset wakeup time (YES in #5), the second lighting unit 32 is further lit while the first lighting unit 31 has been lit. The illuminance on the face of the sleeper, however, is kept equal to or smaller than 40 lx ten minutes before the preset wake-up time (#6). FIG. 3 shows a lighting condition of the wake-up apparatus 1 ten minutes before the preset wake-up time, and in a condition that only the first lighting unit 31 is lit. FIG. 4 shows a lighting condition of the wake-up apparatus 1 ten minutes before the preset wake-up time, and in a condition that the second lighting unit 32 starts to light. In this way, incrementation velocity of the illuminance on the face of the sleeper suddenly changes by light output from the second lighting unit 32 before and after the time ten minutes before the preset wake-up time.

Figure 5:
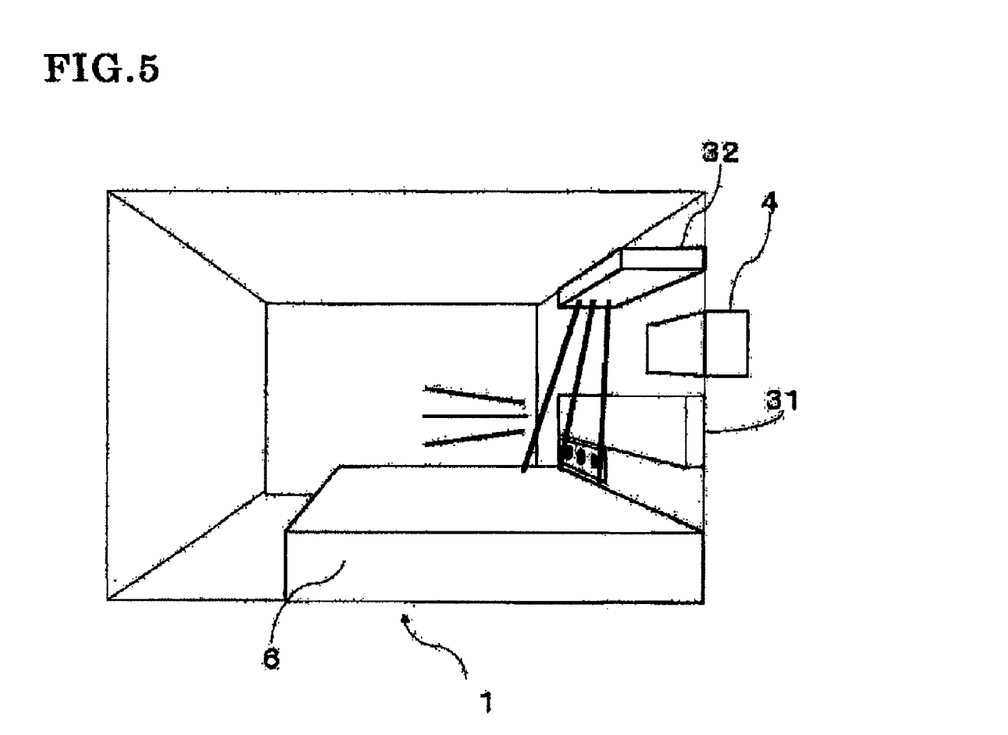
FIG. 5 is a view showing a lighting condition of the above wake-up apparatus within 1 minute before the preset wake-up time.
Figure 6:
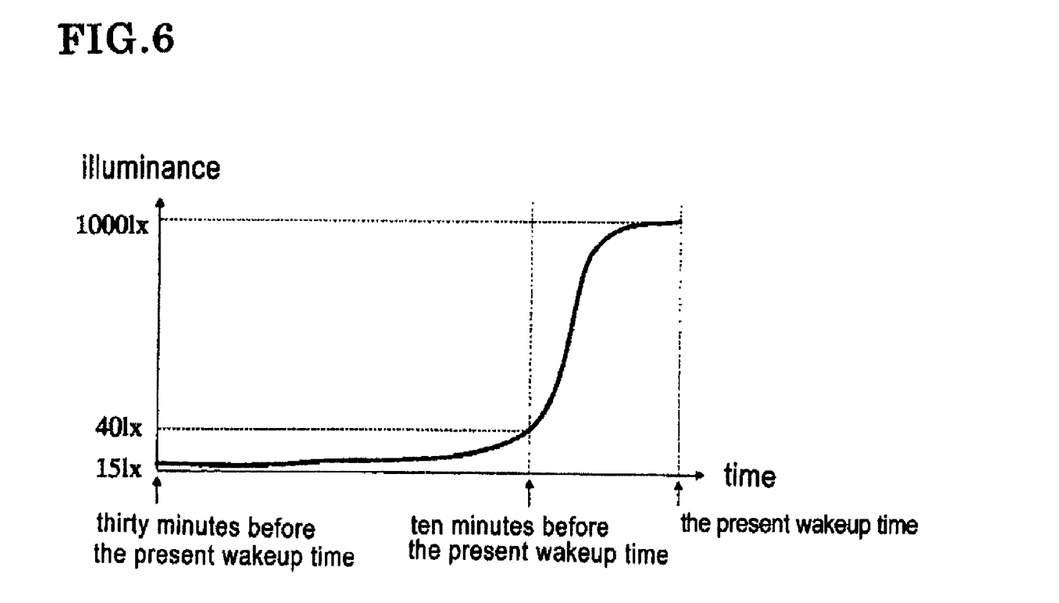
FIG. 6 is a graph showing a variation of illuminance on a face of the sleeper by the above wake-up apparatus.

The control device 4 still further monitors current time counted by the timer, and when it becomes 1 minutes before the preset wake-up time (YES in #7), luminance (intensity of the output light) of the second lighting unit 32 is increased at a maximum value in a predetermined range so that the illuminance on the face of the sleeper becomes equal to or larger than 1,000 lx (#8). FIG. 5 shows a lighting condition of the wake-up apparatus 1 within one minute before the preset wake-up time.

Subsequently, results of measurement of wake-up feeling of a principal sleeper (principal examinee) who was a subject of the wake-up operation and a sleeper on an adjoining bed (supplemental examinee) corresponding to variation existences and kinds of the first lighting unit 31 and the second lighting unit 32 of the lighting device 3, existence of the headboard 5, and the variation of the illuminance on the face of the sleeper at the start of the wake-up operation (at the time 30 minutes before the preset wake-up time) are shown in table 1. In addition, luminance of the light source was varied so that the illuminance on the face of the sleeper at the preset wake-up time became constant value.

The illuminance on the face of the principal examinee was measured so that a photo receiver of an illuminometer was installed at a center between both eyes of the principal examinee and parallel to the face. When the face of the principal examinee turned upward on wake-up, it was measured to turn the photo receiver upward. When the face of the principal examinee turned rightward on wake-up, it was measured to turn the photo receiver rightward. In addition, the luminance of the light emitting face of the light source was measured so that a photo receiver of a luminance meter was installed at a center between both eyes of the principal examinee and parallel to the face, and a reference point of measurement of the luminance meter was put on the highest point of the luminance in a field of view. In addition, the wake-up feelings of the principal examinee and the supplemental examinee were estimated by subjective estimation experimentation.

TABLE 1

| | LIGHT SOURCE OF FIRST LIGHTING UNIT | LIGHT SOURCE OF SECOND LIGHTING UNIT | HEADBOARD (PROTRUSION FROM WALL) | ILLUMINANCE ON FACE OF PRINCIPAL EXAMINEE (30 MINUTES BEFORE PRESET WAKE-UP TIME) | ILLUMINANCE ON FACE OF PRINCIPAL EXAMINEE (AT PRESET WAKE-UP TIME) |
|---|---|---|---|---|---|
| FIRST PRACTICAL EXAMPLE | LED | DISCHARGE LAMP | YES | 1 | 1000 |
| SECOND PRACTICAL EXAMPLE | LED | INCANDESCENT LAMP | YES | 1 | 1000 |
| THIRD PRACTICAL EXAMPLE | INCANDESCENT LAMP | DISCHARGE LAMP | YES | 2 | 1000 |
| FOURTH PRACTICAL EXAMPLE | DISCHARGE LAMP | DISCHARGE LAMP | YES | 15 | 1000 |
| FIFTH PRACTICAL EXAMPLE | DISCHARGE LAMP | INCANDESCENT LAMP | YES | 15 | 1000 |
| FIRST COMPARATIVE EXAMPLE | NON | DISCHARGE LAMP | YES | 15 | 1000 |
| SECOND COMPARATIVE EXAMPLE | NON | DISCHARGE LAMP | NO | 15 | 1000 |
| THIRD COMPARATIVE EXAMPLE | LED | DISCHARGE LAMP | NO | 1 | 1000 |
| FOURTH COMPARATIVE EXAMPLE | INCANDESCENT LAMP | DISCHARGE LAMP | NO | 2 | 1000 |

| | LUMINANCE ON LIGHT EMITTING FACE OF LIGHT SOURCE (30 MINUTES BEFORE PRESET WAKE-UP TIME) | LUMINANCE ON LIGHT EMITTING FACE OF LIGHT SOURCE (AT PRESET WAKE-UP TIME) | WAKE-UP FEELING BY PRINCIPAL EXAMINEE | WAKE-UP FEELING BY SUPPLEMENTAL EXAMINEE |
|---|---|---|---|---|
| FIRST PRACTICAL EXAMPLE | 0 | 10000 | ◎ | ◎ |
| SECOND PRACTICAL EXAMPLE | 0 | 20000 | ○ | ◎ |
| THIRD PRACTICAL EXAMPLE | 0 | 6000 | ◎ | ○ |
| FOURTH PRACTICAL EXAMPLE | 30 | 5000 | ◎ | ○ |
| FIFTH PRACTICAL EXAMPLE | 30 | 15000 | ○ | ○ |
| FIRST COMPARATIVE EXAMPLE | 30 | 25000 | x | ○ |
| SECOND COMPARATIVE EXAMPLE | 30 | 25000 | x | x |
| THIRD COMPARATIVE EXAMPLE | 0 | 10000 | ◎ | x |

TABLE 1-continued

| | | | | |
|---|---|---|---|---|
| FOURTH COMPARATIVE EXAMPLE | 0 | 6000 | ◉ | x |

First, third and fourth practical examples and first and second comparative examples are referred to. Although these were in common with using discharge lamps as the second lighting unit, if the illuminance 1000 lx on the face of the sleeper was achieved by only the second lighting unit without using the first lighting unit like the first and second comparative examples, the luminance of the light source became much higher so that the principal examinee might feel glare. The same goes for a case with reference to the first or second comparative example and the third or fourth comparative example. From this, glare can be reduced in a high illuminance emitting condition by lighting both of the first lighting unit and the second lighting unit like the present invention. In particular, since the first lighting unit is provided at the position where the lighting unit cannot be observed directly by the principal examinee (sleeper), it is very effective to reduce the glare.

Subsequently, the first practical example and the third comparative example are referred to. Although these were in common with using the LEDs as the first lighting unit and the discharge lamps as the second lighting unit, and the luminance values of the light sources were the same, there was a difference in existence or nonexistence of the headboard. In either case, wake-up feeling of the principal examinee was favorable, but wake-up feeling of the supplemental examinee was not comfortable in the third comparative example without the headboard. From this, it is found that the headboard functions effectively. When referring to the third practical example and the fourth comparative example or when referring to the first comparative example and the second comparative example, similar consequence was obtained.

Furthermore, the first practical example and the second practical example are referred to. The discharge lamp was used in the first practical example as the second lighting unit, but incandescent lamps were used as the second lighting unit in the second practical example. Therefore, it was found that the luminance of the light source at the preset wake-up time in the second practical example with the incandescent lamp was higher, so that the principal examinee felt glare. It seems that this phenomenon depends on the difference between the configuration of the discharge lamp and that of the incandescent lamp, that is, the difference between luminance distributions of the light sources. From this, it was found that the discharge lamp was suitable for the light source of the second lighting unit than the incandescent lamp. The incandescent lamp in this case, however, was estimated in down light state where the light source was unwrapped. Even when the incandescent lamp is used, it is possible to reduce glare of the principal examinee by diffusing the luminance sufficiently with a milky-white diffusing panel or the like. In that case, since light distribution is narrower, it is difficult to obtain desired illuminance with diffusing sufficiently.

Still furthermore, the first practical example and the third practical example or the fourth practical example are referred to. Although these were in common with using the discharge lamps as the second lighting unit, it was different that the LEDs were used in the first practical example, the incandescent lamp was used in the third practical example and the discharge lamp was used in the fourth practical example as the first lighting unit. Since the incandescent lamp and the discharge lamp are difficult to control the distribution than the LEDs, light may easily be leaked in periphery, so that the wake-up feeling of the supplemental examinee was deteriorated slightly. From this, it was found that the LEDs were suitable for the light source of the first lighting unit than the incandescent lamp or the discharge lamp.

From the experiment results shown in table 1, when it was assumed that the first to fifth practical examples which were estimated as ○ or ◉ by both of the principal examinee and the supplemental examinee were splendid, luminance of the light source was preferable to be equal to or smaller than 20,000 cd/m$^2$, more preferably, equal to or smaller than 10,000 cd/m$^2$. Thereby, it is possible to reduce the possibility that the principal examinee feels glare. In addition, either of the LEDs, the incandescent lamp and the discharge lamp can be used for the light source of the first lighting unit, but the LEDs are preferable. Furthermore, either of the incandescent lamp and the discharge lamp can be used for the light source of the second lighting unit, but the discharge lamp is preferable. Still furthermore, in consideration with the wake-up feeling of the supplemental examinee, the headboard is necessary, but when the supplemental examinee, that is, the adjoining sleeper is not existed, the headboard is unnecessary.

Since the present invention is not limited to the above mentioned configuration in the embodiment, various modifications can be applied. Thus, it is sufficient to comprise at least a setting device for setting a preset wake-up time by a sleeper, a lighting device having a first lighting unit which is disposed at a position so that a light emitting face thereof is not observed directly from the sleeper and a second lighting unit disposed at a position so that a light emitting face thereof is observed directly from the sleeper, and a control device which activates the lighting device a predetermined time before the preset wake-up time so as to vary illuminance of light emitted from the lighting device in an order of low illuminance, middle illuminance and high illuminance, and wherein the control device lights only the first lighting unit in a low illuminance condition and a middle illuminance condition, and lights both of the first lighting unit and the second lighting unit in a high illuminance condition, and quickly varies from the middle illuminance condition to the high illuminance condition.

According to such a configuration, since a part of light in a high illuminance light emitting condition is borne by the first lighting unit that the light emitting face is disposed at a position not observed directly by the sleeper, it is possible to reduce the luminance of the second lighting unit that the light emitting face is disposed at the position directly observed by the sleeper, and thus, the possibility that the sleeper feels glare can be reduced.

Furthermore, it is preferable that a headboard which is to be disposed on the bedside of the sleeper is further comprised when an adjoining sleeper exists, the first lighting unit is disposed at a lower position inside the headboard and the second lighting unit is disposed at a position above the first lighting unit inside the headboard. According to such a configuration, output light from the lighting device, in particular, output light from the second lighting unit which emits light in high illuminance light emitting condition becomes hard to leak from the headboard. Therefore, even when a plurality of beds is provided in a bedroom, it is possible to reduce light stimulus to an adjoining sleeper not on the wake-up time. Furthermore, since the first lighting unit is provided at a position below the second lighting unit, a high luminance area of the first lighting unit can easily be disposed outside of the field of view of the principal sleeper, and the first lighting unit can be disposed near to the principal sleeper, so that the light from the first lighting unit cannot be dispersed in periphery, and thus, light stimulus to the principal sleeper can be reduced much more.

In addition, it is preferable that the light emitting face of the first lighting unit is substantially perpendicular to a bed face on which the sleeper sleeps. Furthermore, it is preferable that the light emitting face of the second lighting unit is substantially parallel to the bed face on which the sleeper sleeps and looking downward. Thereby, a necessary illuminance can be ensured while the glare to the principal sleeper due to the output light of the lighting device can be reduced.

This application is based on Japanese patent application 2005-340106 filed in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

The invention claimed is:

1. A wake-up apparatus comprising:
   a setting device for setting a preset wake-up time by a sleeper;
   a lighting device having a first lighting unit which is disposed at a position so that a first planar light emitting face of the first lighting unit is substantially perpendicular to a bed face on which the sleeper sleeps and a second lighting unit disposed at a position so that a second planar light emitting face of the second lighting unit is substantially parallel to the bed face; and
   a control device which activates the lighting device a predetermined time before the preset wake-up time so as to vary illuminance of light emitted from the lighting device in an order of low illuminance, middle illuminance and high illuminance, to light only the first lighting unit in a low illuminance condition and a middle illuminance condition, and to light both of the first lighting unit and the second lighting unit in a high illuminance condition, and quickly varies from the middle illuminance condition to the high illuminance condition.

2. The wake-up apparatus in accordance with claim 1, wherein a luminance value of a highest portion of luminance on the light emitting face of the second lighting unit is equal to or smaller than 20,000 $cd/m^2$.

3. The wake-up apparatus in accordance with claim 1, wherein the first lighting unit includes light emitting diodes as a light source.

4. The wake-up apparatus in accordance with claim 3, wherein the second lighting unit includes a discharge lamp as a light source.

5. The wake-up apparatus in accordance with claim 1, wherein the second lighting unit includes a discharge lamp as a light source.

6. The wake-up apparatus in accordance with claim 1, further comprising a headboard which is disposed on a bedside of the sleeper, and wherein
   the first lighting unit is disposed at a lower position inside the headboard and the second lighting unit is disposed at a position above the first lighting unit inside the headboard.

* * * * *